(12) United States Patent
Laube et al.

(10) Patent No.: US 7,469,907 B2
(45) Date of Patent: Dec. 30, 2008

(54) MECHANICALLY ACTUATED WORKPIECE HOLDER INCLUDING A PLASTIC COLLET

(75) Inventors: Robert Laube, Marine City, MI (US); William M. Andre, Rochester Hills, MI (US)

(73) Assignee: Hydra-Lock Corporation, Mt. Clemens, MI (US)

( * ) Notice: Subject to any disclaimer, the term of this patent is extended or adjusted under 35 U.S.C. 154(b) by 137 days.

(21) Appl. No.: 10/985,406

(22) Filed: Nov. 10, 2004

(65) Prior Publication Data

US 2006/0097463 A1   May 11, 2006

(51) Int. Cl.
*B23B 31/20* (2006.01)
(52) U.S. Cl. .................... 279/43.4; 279/2.03; 279/2.12
(58) Field of Classification Search ............... 279/2.02, 279/2.03, 2.04, 2.11, 2.12, 47, 53, 42–43.8, 279/46.1–54, 152
See application file for complete search history.

(56) References Cited

U.S. PATENT DOCUMENTS

| | | | |
|---|---|---|---|
| 2,829,899 A | 4/1958 | Drew et al. | |
| 2,896,954 A | 7/1959 | Ernest | |
| 3,335,569 A | 8/1967 | Atherholt, Sr. | |
| 3,360,276 A | 12/1967 | Peffer | |
| 3,411,796 A * | 11/1968 | Decker | 279/46.4 |
| 3,448,988 A | 6/1969 | Athansiou | |
| 3,497,226 A | 2/1970 | Hohwart et al. | |
| 3,517,939 A * | 6/1970 | Jaehn | 279/2.03 |
| 3,620,637 A * | 11/1971 | Brown | 408/202 |
| 3,637,156 A | 1/1972 | Sheperd | |
| 3,638,979 A | 2/1972 | Francois et al. | |
| 3,677,559 A | 7/1972 | Andre et al. | |
| 3,761,008 A | 9/1973 | Goulder | |
| 3,765,074 A * | 10/1973 | Payne | 279/46.5 |
| 3,829,147 A | 8/1974 | Ryswick | |
| 3,910,098 A | 10/1975 | Tailhardat | |
| 3,999,769 A | 12/1976 | Bayer et al. | |
| 4,094,104 A | 6/1978 | Zerhafs et al. | |
| 4,211,425 A * | 7/1980 | Halvorsen | 279/46.4 |
| 4,284,283 A | 8/1981 | Stermann | |
| 4,422,653 A | 12/1983 | Piotrowski | |
| 4,502,703 A | 3/1985 | Rohm | |
| 4,570,950 A | 2/1986 | Morawski et al. | |
| 4,724,595 A | 2/1988 | Snyder | |
| 4,811,962 A | 3/1989 | Cameron, Jr. | |
| 4,971,340 A * | 11/1990 | Rall | 279/57 |
| 4,979,853 A | 12/1990 | Field | |
| 5,286,042 A | 2/1994 | Laube | |
| 5,295,723 A * | 3/1994 | Kronseder | 294/88 |
| 5,397,135 A * | 3/1995 | Smith | 279/2.04 |
| 5,711,538 A | 1/1998 | Retzbach et al. | |
| 5,921,563 A * | 7/1999 | Huggins et al. | 279/131 |

(Continued)

FOREIGN PATENT DOCUMENTS

GB    2 025 278    1/1980

(Continued)

*Primary Examiner*—David P Bryant
*Assistant Examiner*—Eric A Gates
(74) *Attorney, Agent, or Firm*—Reising, Ethington, Barnes, Kisselle, P.C.

(57) ABSTRACT

A mechanically actuated workpiece holding apparatus comprising a collet at least partially composed of a plastic material. The collet may include cantilevered leaves and may be a plastic coating over a metal substrate.

24 Claims, 5 Drawing Sheets

U.S. PATENT DOCUMENTS

| | | |
|---|---|---|
| 5,944,325 A | 8/1999 | Schmeisl |
| 6,077,003 A | 6/2000 | Laube |
| 6,123,285 A * | 9/2000 | Border et al. ............ 242/571.4 |
| 6,497,419 B2 * | 12/2002 | Varnau ....................... 279/141 |
| 6,533,292 B2 * | 3/2003 | Fant ............................. 279/43 |
| 6,862,785 B2 * | 3/2005 | Baumgartner ............... 29/26 A |
| 6,883,407 B2 * | 4/2005 | Smith et al. .................. 82/124 |
| 6,908,085 B2 * | 6/2005 | Gerber ...................... 279/43.1 |
| 2003/0001345 A1 | 1/2003 | McFadden |

FOREIGN PATENT DOCUMENTS

| | | | |
|---|---|---|---|
| JP | 2004066398 A | * | 3/2004 |
| SU | 1602662 A | * | 10/1990 |

* cited by examiner

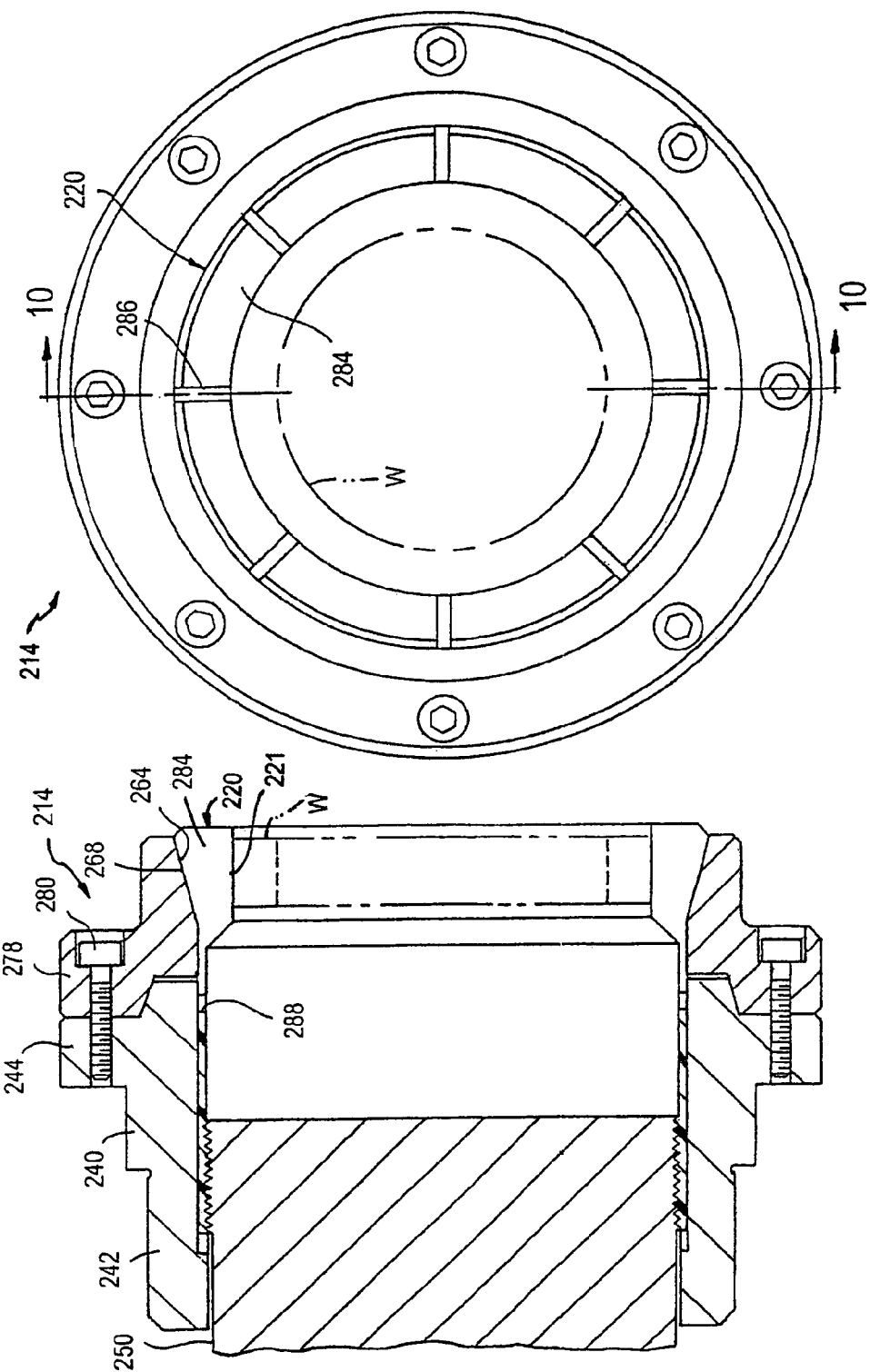

MECHANICALLY ACTUATED WORKPIECE HOLDER INCLUDING A PLASTIC COLLET

FIELD OF THE INVENTION

The present invention relates to machine tools and, more specifically, to workpiece holding apparatuses.

BACKGROUND OF THE INVENTION

Workpiece holding apparatuses have been used for a number of years to hold solid and annular workpieces for subsequent machining or grinding. As is known, workpiece holding apparatuses may be mechanically actuated or hydraulically actuated. Mechanically actuated workpiece holders typically have a collet that is adapted for holding a workpiece by collapsing around the workpiece or by expanding within the workpiece. The collet is generally cylindrical and includes a number of leaves that are defined by relief slots that allow the collet to radially expand and contract. The collet also has a tapered portion that cooperates with a corresponding tapered portion of an actuating mechanism that actuates the collet. The actuating mechanism is linearly displaceable to impose a linear force on the collet, wherein the linear displacement of the actuating mechanism is converted to radial displacement of the collet via the corresponding tapered portions.

Unfortunately, however, workpiece holding apparatuses having collets tend to have some drawbacks. Mechanically actuated workpiece holders using conventional collets often yield line-contact engagement with a workpiece wherein only one or two leaves of the collet fully engage the workpiece. This line-contact engagement may yield insufficient holding force on the workpiece wherein the workpiece may rotate relative to the collet. Moreover, line-contact engagement may render the collet unfit for conforming to an out-of-round workpiece. Worse yet, line-contact engagement may also induce lobing of the workpiece during the machining process, thereby creating an out-of round workpiece. Such out-of-round workpieces must then be subjected to a subsequent finishing process to smooth out-of-round surfaces on the workpiece into a more suitably rounded cylindrical surface to establish an acceptable final product. Such subsequent finishing processes are time consuming, expensive and relatively inefficient.

In contrast to mechanically actuated workpiece holders, hydrostatic or hydraulically actuated workpiece holders typically include a body, a cylindrical expansion sleeve mounted around the body and defining a fluid chamber therebetween, seals between the expansion sleeve and the body for sealing off the fluid chamber, and one or more workpiece sleeves mounted around the expansion sleeve. A hydraulic system communicates with the fluid chamber by hydraulic fluid circuits and pressurizes the fluid chamber to radially expand the expansion sleeve and, in turn, radially displace the workpiece sleeves into engagement with a workpiece. The performance of typical hydraulically actuated workpiece holders may be constrained in some applications, such as where workpiece tolerances are wide. In such extraordinary applications, a typical hydraulically actuated workpiece holder may not exhibit radial displacement required to grip all workpieces falling within the wide tolerance band.

SUMMARY OF THE INVENTION

A mechanically actuated workpiece holding apparatus includes a collet that is at least partially composed of a plastic material. The mechanically actuated workpiece holding apparatus may be an arbor or a chuck. Other preferred aspects of the present invention include the collet having cantilevered leaves and being composed of a metal substrate coated with a plastic resin.

At least some of the objects, features and advantages that may be achieved by at least certain embodiments of the invention include providing a workpiece holding apparatus that allows for firmly holding a workpiece of exceptionally hard material composition that experiences exceptionally high cutting forces, enables circumferential surface-to-surface contact of the workpiece to avoid line-contact issues such as insufficient workholding force and workpiece lobing, is capable of high performance applications such as high pressure gripping of workpieces having a relatively high diameter-to-length ratio, can conform to a workpiece that is out-of-round, is of relatively simple design and economical manufacture and assembly, and is reliable with a long useful life in service.

Of course, other objects, features and advantages will be apparent in view of this disclosure to those skilled in the art. Various implementations of workpiece holding apparatuses embodying the invention may achieve more or less than the noted objects, features or advantages.

BRIEF DESCRIPTION OF THE DRAWINGS

These and other objects, features and advantages of the present invention will be apparent from the following detailed description of the preferred embodiments and best mode, appended claims, and accompanying drawings in which:

FIG. 8 is a cross-sectional side view of a workpiece holding apparatus in the form of a chuck according to a third exemplary embodiment of the present invention;

FIG. 9 is an end view of the workpiece holding apparatus of FIG. 8, illustrating quarter section lines.

DETAILED DESCRIPTION OF THE PREFERRED EMBODIMENTS

First Embodiment

Figure 1:
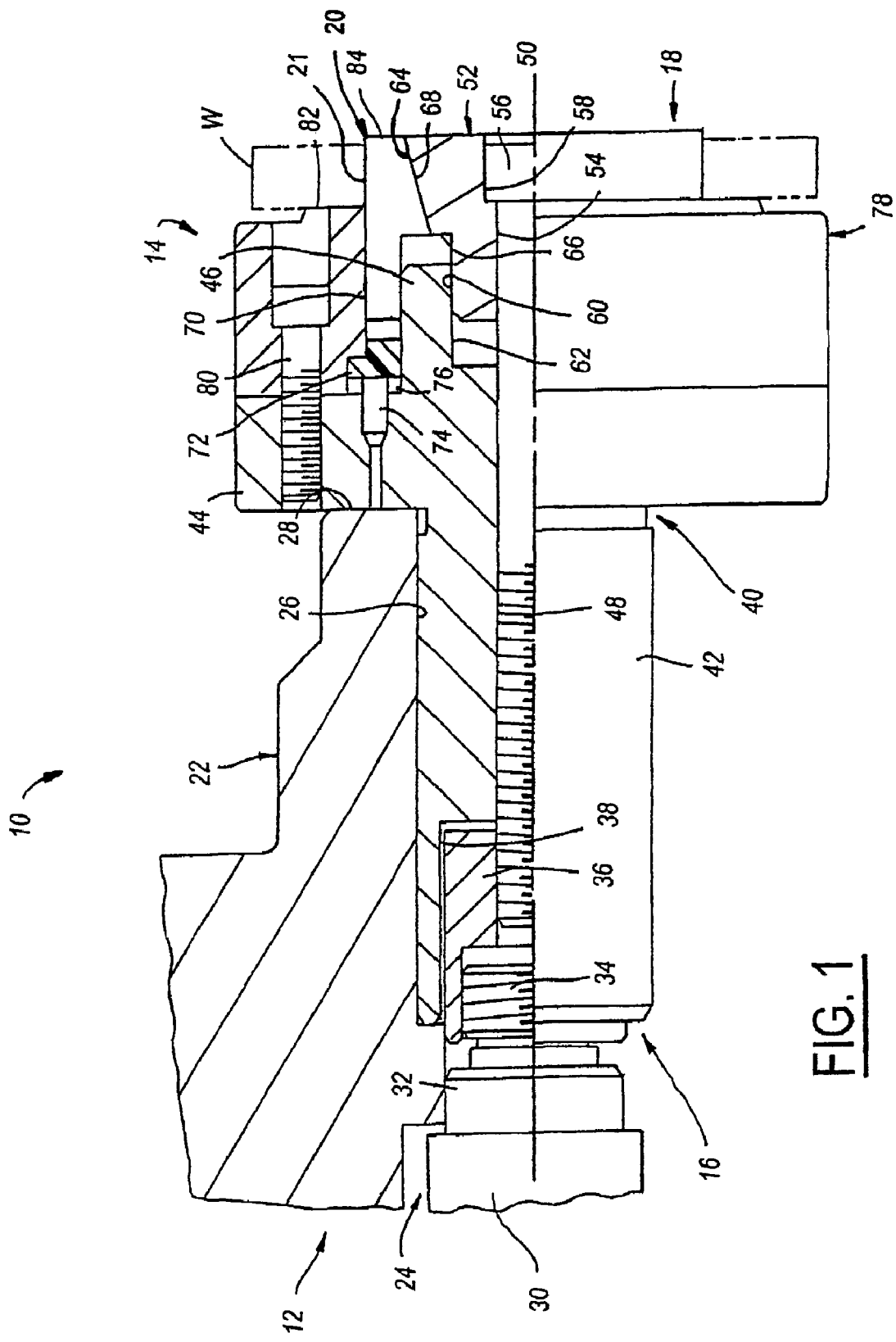
FIG. 1 is a quarter-sectional side view of a machine tool setup including a machine portion and a workholding apparatus in the form of an arbor according to a first exemplary embodiment of the present invention.
Figure 2:
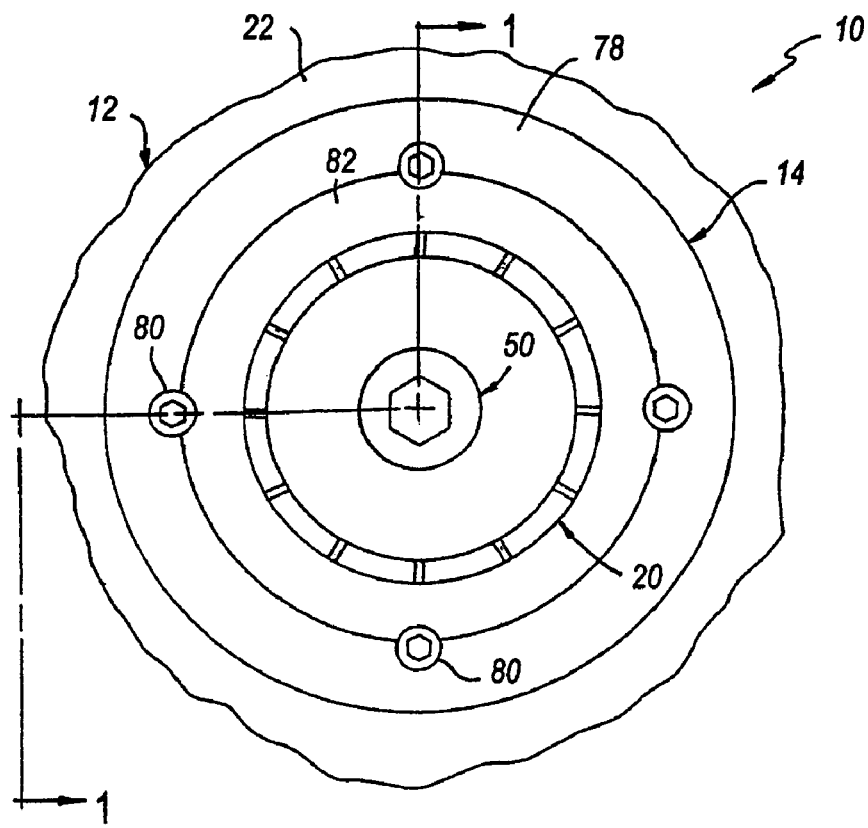
FIG. 2 is an end view of the machine tool setup of FIG. 1, illustrating quarter section lines.

Referring in detail to the drawings, FIGS. 1 through 4 illustrate a first exemplary embodiment of the present invention. FIGS. 1 and 2 illustrate a machine setup 10 that includes a machine tool 12 and a workholding apparatus 14 attached thereto. As shown in FIG. 1, the workholding apparatus 14 includes an inboard or machine end 16, an oppositely disposed outboard or workpiece end 18, a collet 20 according to the first exemplary embodiment of the present invention, and a cylindrical workpiece W mounted to the workholding apparatus 14 over a workpiece-engaging surface of revolution 21, or outer cylindrical surface, of the collet 20. The workpiece W may be a cast iron seal or sleeve, a steel seal or gear blank, or other like hard material workpieces. The collet 20 may be machined from bar stock or injection molded, and may be composed of polyurethane, polyamide, or any other suitable engineering thermoplastic or thermoset plastic material. As used herein, the term collet refers to a component that is generally cylindrical but also slotted and tapered.

The machine tool 12 is only partially depicted and includes a spindle 22 and an actuating mechanism 24 located centrally with respect thereto, as is well known in the art. The spindle 22 is rotatingly driven by any suitable drive apparatus such as a direct drive motor, motor and geartrain, motor and beltdrive, and the like (not shown). The spindle 22 includes a cylindrical socket 26 for accepting and retaining a portion of the workholding apparatus 14 and further includes a locating surface 28 for axially locating the workholding apparatus 14. The actuating mechanism 24 may be any suitable linear motion device such as a powered screw device, or a hydraulic cylinder 30 with a piston and actuator rod 32 as shown, which are well known in the art, or the like. An outer diameter of a free end 34 of the rod 32 has external threads for threading engagement with corresponding internal threads on a connector 36 of the workholding apparatus 14. A portion of the workholding apparatus 14 is thus translatably engaged to the machine tool 12 of the machine setup 10.

The workholding apparatus 14 is also fixed to the machine tool 12 against relative rotation therebetween, via the spindle 22. The workholding apparatus 14 includes the previously mentioned connector 36 that may be composed of heat-treated high carbon steel and that is located within a counterbore 38 of a body 40, which has a cylindrical shank 42 for acceptance within the socket 26 of the spindle 22. The body 40 may be composed of heat-treated high carbon steel and may be releasably engaged to the spindle 22 using any suitable connection, for example using set screws (not shown) through the spindle 22 that tighten against the body shank 42. The body 40 includes a radially extending flange 44 that locates against the locating surface 28 of the spindle 22, an axially extending annular flange 46 for supporting the collet 20, and a throughbore 48 for accepting an actuator such as a draw bar or bolt 50 therethrough.

The draw bolt 50 may be composed of any suitable fastener material such as low carbon steel and is threaded at its machine end for engagement to internal threads of the connector 36, wherein the draw bolt 50 and connector 36 provide actuating linkage between the actuating mechanism 24 of the machine 12 and an actuator or draw plug 52 of the workholding apparatus 14. The draw bolt 50 extends in an outboard direction through the throughbore 48 of the body 40, through a throughbore 54 of the draw plug 52, and includes a head 56 that terminates the draw bolt 50 at its workpiece end and is captured within a counterbore 58 of the draw plug 52. The draw plug 52 may be composed of a heat-treated high carbon steel and is a generally cylindrical component that includes a straight outside diameter annular portion 60 that is supported by and adapted for sliding engagement within an inside diameter counterbore 62 of the axial flange 46 of the body 40, and further includes a frusto-conical surface of revolution or circumferential outer taper portion 64 and a locating shoulder 66. The taper 64 is adapted for corresponding axial sliding engagement with a frusto-conical surface of revolution or circumferential inner taper portion 68 of the collet 20.

The collet 20 may be composed of any suitable polymeric material such as any suitable thermoplastic or thermoset like polyurethane, polyamide, or any other suitable engineering plastic material. The collet 20 is a generally cylindrical component that includes the taper surface 68 and that extends rearwardly from its workpiece end to a straight annular portion 70 that is supported by the axial annular flange 46 of the body 40, and terminates in a radially extending integral flange 72 that is doweled to the radial flange 44 of the body by two or more dowel pins 74 that are preferably equidistantly circumferentially spaced and axially mounted or received within corresponding radial slots or reliefs 76 in the collet flange 72. The dowel arrangement prevents the collet 20 from rotating relative to the body 40. The collet flange 72 is axially trapped between the end face of the radially extending flange 44 of the body 40 and a nose cap 78 and is radially trapped between the axial annular flange 46 of the body 40 and the nose cap 78. The nose cap 78 may be composed of a heat-treated high carbon steel and is bolted to the radial flange 44 of the body 40 by four socket-head cap screws 80 and includes an axially-locating radially-extending annular surface 82 at its outboard or workpiece end for supporting the workpiece W.

Figure 3:
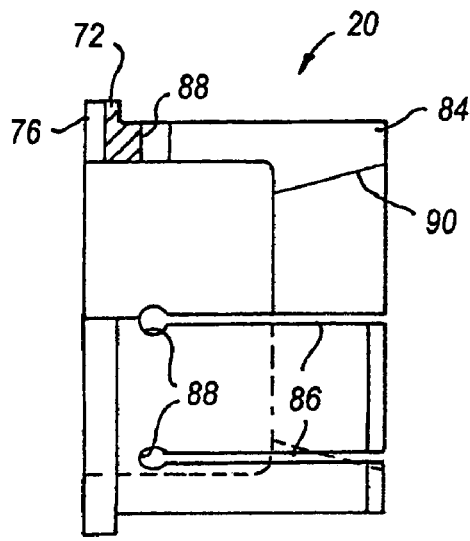
FIG. 3 is a quarter-sectional side view of a collet of the workholding apparatus of FIGS. 1 and 2.
Figure 4:
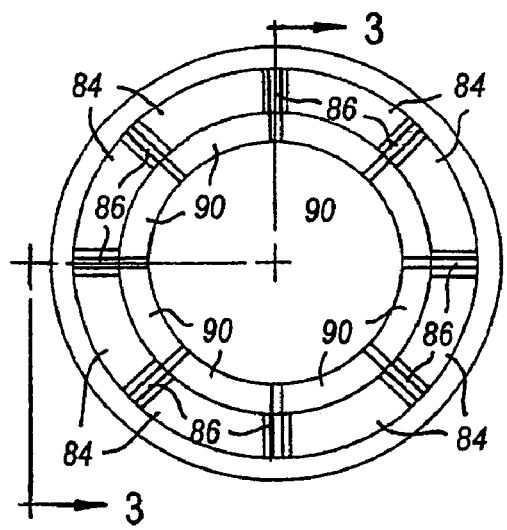
FIG. 4 is an end view of the collet of FIG. 3, illustrating quarter section lines.

As shown in FIGS. 3 and 4, the collet 20 includes several cantilevered fingers or leaves 84 that are formed by slots 86 that are cut or formed longitudinally or axially into the collet 20 and extend radially through the collet 20. The slots 86 are equidistantly spaced about the circumference of the collet 20, begin at the outboard or workpiece end thereof, extend straight rearwardly, and terminate in a hole 88 that is drilled or formed radially through the collet 20. Accordingly, the frusto-conical surface or inner taper 68 of the collet 20 is collectively defined by a plurality of inner tapered segments 90, one on each of the leaves 84. The inner tapered segments 90 are preferably disposed at an included angle of about fifteen degrees to the longitudinal axis of the collet 20, but may range from five to forty-five degrees or more to the longitudinal axis, if necessary.

Referring again to FIG. 1, to assemble the workpiece holding apparatus 14 the dowel pins 74 are first inserted into the radial flange 44 of the body 40. Then the collet 20 is assembled over the axial flange 46 of the body 40, rotated until the dowel pins 74 locate within the slots 76 in the radial flange 72 of the collet 20, and located against the body 40 such that the radial flange 72 of the collet 20 seats squarely against the radial flange 44 of the body 40. The nose cap 78 is thereafter assembled over the collet 20 to retain the collet 20 axially and radially. The cap screws 80 are then inserted through the nose cap 78 and secured to the body 40. The draw plug 52 is inserted into the axial flange 46 of the body 40 and into the collet 20 until the cooperating tapers 64, 68 engage. Finally, the connector 36 is inserted into the counterbore 38 in the shank 42 of the body 40 while the draw bolt 50 is inserted through the draw plug 52 and body 40, and thereafter the connector 36 and draw bolt 50 are threaded together to complete the assembly.

In operation, the default state of the rod 32 of the machine tool 12 is extended in the outboard direction such that the collet 20 is relaxed. This enables the workpiece W to be assembled over the collet 20 and flush against the locating surface 82 of the nose cap 78. Then, the rod 32 is retracted or withdrawn into the cylinder 30 under hydraulic pressure to pull the connector 36, draw bolt 50, and draw plug 52 rearward in an inboard direction. Under simple machine wedge principles, this inboard axial displacement of the draw plug 52 produces radial outward displacement of the leaves 84 of the collet 20 due to the sliding action of the cooperating tapers 64, 68. Accordingly, the outer diameter 21 of the collet 20, or outer surfaces of the leaves 84, circumferentially engage the inside diameter of the workpiece W to hold the workpiece W in place under frictional engagement therewith. Then, the spindle 22 is rotated to a suitable speed and the outer diameter and/or outboard face of the workpiece W is subsequently machined to specification such as with a turning tool or a grinding wheel (not shown). Once the machining step is complete, the spindle rotation is halted, the rod 32 extended, and the workpiece W removed.

Second Embodiment

Figure 5:
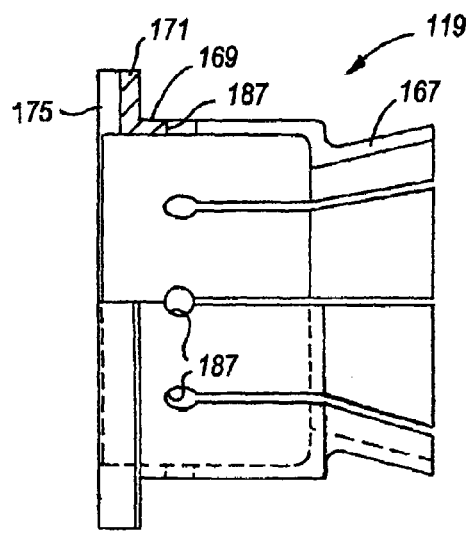
FIG. 5 is a quarter-sectional side view of a collet substrate used to produce a collet, which is depicted in FIG. 7 according to a second exemplary embodiment of the present invention.
Figure 6:
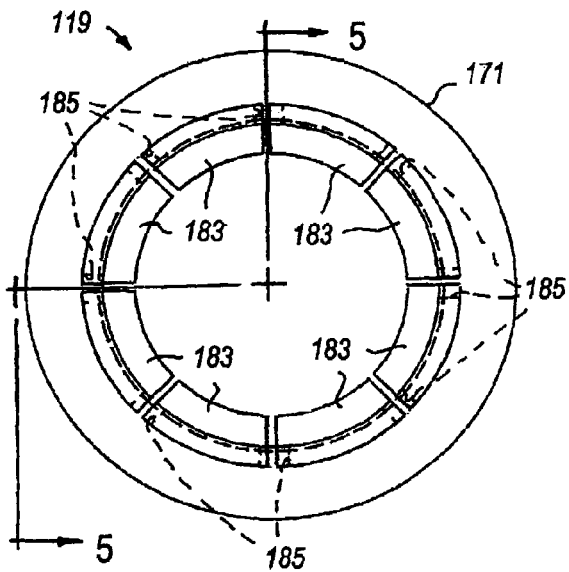
FIG. 6 is an end view of the collet substrate of FIG. 5, illustrating quarter section lines.
Figure 7:
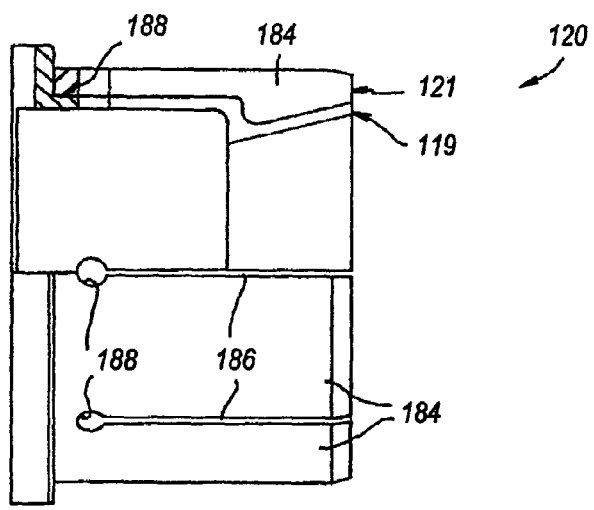
FIG. 7 is a quarter-sectional side view of a collet according to the second exemplary embodiment of the present invention that is comprised of the collet substrate of FIGS. 5 and 6 and a plastic coating applied thereto.

FIGS. 5 through 7 illustrate a second exemplary embodiment of the present invention. This embodiment is similar in many respects to the embodiment of FIGS. 1 through 4 and like numerals between the embodiments designate like or corresponding elements throughout the several views of the drawing figures. Additionally, the common subject matter will generally not be repeated here.

FIG. 5 illustrates a quarter-sectional view of a collet substrate 119 that is preferably composed of a metal such as a high carbon steel. The collet substrate 119 is preferably heat treated to a hardness of Rc 44-46 and ground. An exemplary wall thickness is preferably about 0.090 inches on an average part inside diameter of about 2.5 inches. The collet substrate 119 is adaptable for use with the workholding apparatus of FIGS. 1 and 2. Starting from its inboard or machine end, the collet substrate 119 includes a radially extending mounting flange 171 having one or more reliefs or radial slots 175 for cooperation with the dowel pins 74 in the radial flange 44 of the body 40 to prevent relative rotation as previously described with reference to the embodiment of FIGS. 1 and 2. The collet substrate 119 extends axially forward in the form of a straight cylindrical portion 169 that includes stress-relieving holes 187 that are drilled radially therethrough before the collet substrate 119 is slotted. The collet substrate 119 extends forward and includes a reduced diameter conical portion 167. The conical portion 167 terminates at the workpiece or outboard end of the collet substrate 119. As also shown in FIG. 6, the collet substrate 119 is slotted or split into eight equidistantly spaced leaves 183 by eight equidistantly circumferentially spaced slots 185. As shown in FIG. 5, the slots 185 start at the inboard end of the relief holes 187 and terminate at the outboard end of the collet substrate 119 and extend radially through the substrate 119. In other words, the leaves 183 are cantilevered.

FIG. 7 illustrates a collet 120 according to the second exemplary embodiment of the present invention that is formed by coating the collet substrate 119 of FIGS. 5 and 6 with a plastic coating 121, such as any polyurethane resin, polyamide resin, or any other suitable engineering plastic resin. The collet substrate 119 is first cleaned and primed to remove contaminants and is then coated with any suitable adhesive such as ChemLock Cement, which is available from Roydent of Rochester Hills, Mich. The collet substrate 119 is placed into an open mold (not shown) and the plastic coating 121 is poured in its molten state into the open mold around the collet substrate 119. According to an open cast process, heat and pressure are then applied to cure the molten plastic coating 121 and to adhere the cured coating to the collet substrate 119 to complete the collet 120. The collet 120 is removed and the process repeated. Thereafter, the collet 120 may be machined to form eight relief holes 188 (four shown) and slots 186 (two shown) through the plastic coating 121 in communication with corresponding holes 187 and slots 185 in the collet substrate 119 to establish cantilevered leaves 184 (three shown) in the collet 120. Finally, the collet 120 is usually hard-turned or ground to provide a final workpiece-engaging diameter and cylindrical surface concentric to the longitudinal axis of the collet 120.

Third Embodiment

FIGS. 8 and 9 illustrate a third exemplary embodiment of the present invention. This embodiment is similar in many respects to the embodiments of FIGS. 1 through 7 and like numerals between the embodiments designate like or corresponding elements throughout the several views of the drawing figures. Additionally, the common subject matter will generally not be repeated here.

FIG. 8 illustrates a workholding apparatus in the form of a chuck 214. The chuck 214 includes a body 240 composed of a structural metal such as a low carbon steel. The body 240 includes an annular shank portion 242 for mounting to a machine spindle (not shown) and a radial flange portion 244 to which a nose cap 278 is located and fastened. Four or more cap screws 280 extend through the nose cap 278 and thread into the flange 244 of the body 240 to retain the nose cap 278 thereto. The nose cap 278 includes a frusto-conical surface of revolution or circumferential outer taper portion 264 that mates with a frusto-conical surface of revolution or circumferential inner taper portion 268 of a collet 220.

The collet 220 may be composed of polyurethane, polyamide, or any other suitable engineering thermoplastic or thermoset plastic material, and includes a workpiece-engaging surface of revolution 221, or inner cylindrical surface, for gripping a workpiece W. The collet 220 extends centrally through the nose cap 278 and body 240 from its outboard or workpiece end and terminates in an inboard or machine end having an integral connecting portion, such as a spline, internal threads, or the like, which connect to an actuator such as a draw tube or cylinder 250 via a connecting portion thereof such as complementary mating splines, external threads, or the like. The draw cylinder 250 extends rearwardly into a machine tool (not shown) and is linearly actuated as previously described with respect to the draw bolt of the first exemplary embodiment herein.

As also depicted in FIG. 9, the collet 220 includes eight equidistantly circumferentially spaced cantilevered fingers or leaves 284 that are formed by eight slots 286 that are cut or formed into the collet 220. The slots 286 are equidistantly spaced about the circumference of the collet 220, begin at the outboard or workpiece end of the collet 220, extend straight rearwardly, and terminate in a hole 288 that is drilled or formed radially through the collet 220. Accordingly, the frusto-conical surface or taper of the collet 268 is collectively defined by outer tapered segments, one on each of the leaves 284. The outer tapered segments are preferably disposed at an included angle of about fifteen degrees to the longitudinal axis of the collet 220, but may range from five to forty-five degrees or more to the longitudinal axis if necessary.

In assembly of the chuck 214, the nose cap 278 is first assembled to the radial flange 244 of the body 240 and fastened thereto with the cap screws 280. Then, the collet 220 is inserted into the nose cap 278 and body 240 until the corresponding threads of the collet 220 and draw cylinder 250 engage. Thereafter, the collet 220 is threaded to the draw cylinder 250 until the corresponding tapers 264, 268 of the collet 220 and nose cap 278 initially engage but not so much as to radially deflect the leaves 284 of the collet 220.

In operation, the default state of the piston of the machine tool (not shown) is extended in the outboard direction such that the collet 220 is relaxed. This enables the workpiece W to be inserted into the collet 220. Then, the piston (not shown) is retracted or withdrawn into the cylinder (not shown) under hydraulic pressure to pull the connector (not shown), draw cylinder 250, and collet 220 in an inboard direction. Under simple machine wedge principles, this inboard axial displacement of the collet 220 produces radial inward displacement of the leaves 284 of the collet 220 due to the sliding action of the corresponding and complementary tapers 264, 268. Accordingly, the inner diameter of the collet 220 or inner surfaces of the leaves 284 circumferentially engage the outside diameter of the workpiece W to hold the workpiece W in place under frictional engagement therewith. The spindle (not shown) is rotated to a suitable speed and the inner diameter and/or outboard face of the workpiece W is subsequently machined to specification such as with a turning tool or a grinding wheel. Once the machining is complete, the spindle rotation is halted, the piston extended, and the workpiece W removed.

Fourth Embodiment

Figure 10:
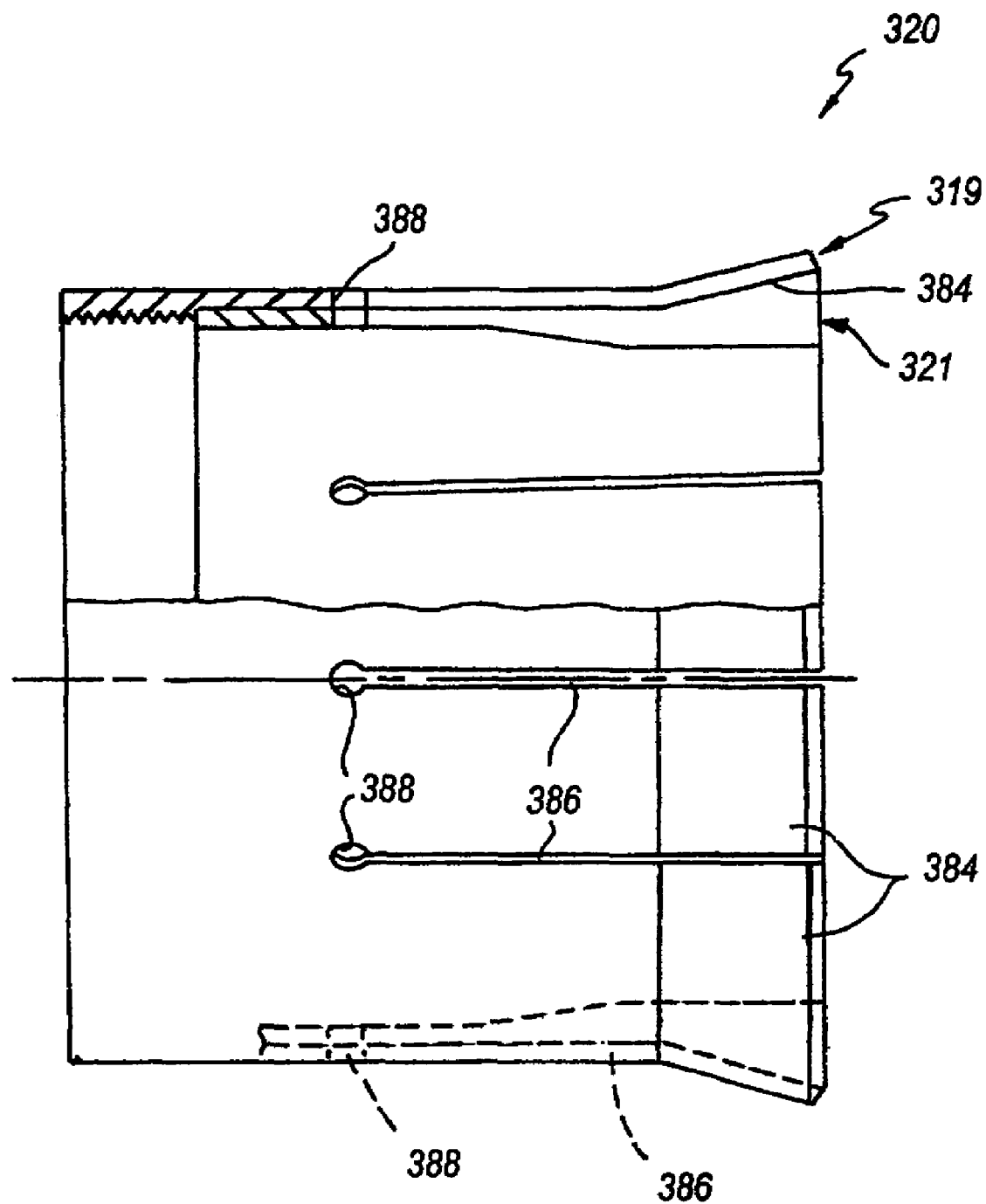
FIG. 10 is a quarter-sectional side view of a collet according to a fourth exemplary embodiment of the present invention.

FIG. 10 illustrates a collet 320 according to a fourth exemplary embodiment of the present invention that is formed by coating the metal collet substrate 319 with a plastic coating 321, such as polyurethane resin, polyamide resin, or any other suitable engineering plastic resin. The manufacturing process is substantially the same as that described with reference to the collet 120 of the second exemplary embodiment of FIG. 7 as previously described. Similarly, the collet 320 includes relief holes 388, radial through slots 386, and cantilevered leaves 384.

With one or more of the embodiments described above, it is now possible in machining parts having large diameter-to-length ratios, to achieve circumferentially uniform surface-to-surface contact normally associated with hydraulically actuated workpiece holders, yet by using a mechanically actuated workpiece holder. Accordingly, the line-contact, insufficient holding force, and lobing problems associated with conventional mechanically actuated workpiece holders are avoided.

While the forms of the invention herein disclosed constitute a presently preferred embodiment, many others are possible. It is not intended herein to mention all the possible equivalent forms or ramifications of the invention. Other workholders of the assignee of the present invention may be adapted for use with the present invention and the materials and structures of such workholders are adaptable for use with the present invention, for example, the workholders of U.S. Pat. No. 3,677,559, U.S. patent application Ser. Nos. 10/765,287, and 10/610,251, which are assigned to the assignee hereof and are incorporated by reference herein. Finally, it is understood that terms used herein are merely descriptive, rather than limiting, and that various changes may be made without departing from the spirit and scope of the invention as defined by the following claims.

What is claimed is:

1. A mechanically actuated workpiece holding apparatus comprising an actuator having a tapered surface, and a collet including a metal substrate that includes a cylindrical portion and a conical portion, a plastic coating adhered and molded to said metal substrate to overlie said conical portion, and opposed surfaces of revolution including a tapered surface of said conical portion of said metal substrate for axial slidable engagement with the tapered surface of the actuator and an oppositely disposed workpiece-engaging surface of said plastic coating.

2. The mechanically actuated workpiece holding apparatus of claim 1 further comprising:
    said collet having at least one relief slot;
    a body supporting said collet; and
    the actuator supported by said body and being linearly displaceable to impose a force on said collet such that linear displacement of said actuator is converted to radial displacement of said collet via said tapered surfaces wherein said collet grips a workpiece.

3. The mechanically actuated workpiece holding apparatus of claim 2, further comprising an annular nose cap mounted to said body and wherein said body includes a radial flange, further wherein said collet is axially trapped between said nose cap and said radial flange.

4. The mechanically actuated workpiece holding apparatus of claim 2 further comprising an annular nose cap mounted to said body and wherein said body includes a radial flange and an axial flange extending therefrom, further wherein said collet is radially trapped between said nose cap and said axial flange.

5. The mechanically actuated workpiece holding apparatus of claim 1, further comprising:
    said collet having at least one relief slot and the tapered surface at an outboard end and a connecting portion at an inboard end;
    a body supporting said collet;
    an annular nose cap attached to said body, said annular nose cap having a tapered surface for cooperating with said tapered surface of said collet; and
    an actuator extending through said body and having a connecting portion for connecting with said connecting portion of said collet, said actuator being linearly displaceable to impose a force on said collet such that linear displacement of said actuator is converted to radial displacement of said collet via said cooperating tapered surfaces of said annular nose cap and said collet wherein said collet grips a workpiece.

6. The mechanically actuated workpiece holding apparatus of claim 1 wherein said collet includes a plurality of cantilevered leaves.

7. The apparatus of claim 1, wherein the plastic coating is coated to the metal substrate such that the metal substrate is first coated with an adhesive and then the plastic coating is molded to the metal substrate and cured to adhere the plastic coating to the metal substrate.

8. A mechanically actuated workpiece holding apparatus comprising:
    a collet at least partially composed of a plastic material wherein said collet includes a metal substrate that includes a cylindrical portion and a conical portion terminating an outboard end of the substrate and being coated with said plastic material, wherein the plastic material is adhered to the metal substrate by coating an adhesive on the metal substrate and then molding the plastic material around the metal substrate, said collet having at least one relief slot and a conical portion;
    a body supporting said collet;
    an actuator supported by said body and having a conical portion for cooperating with said conical portion of said collet, said actuator being linearly displaceable to impose a force on said collet such that linear displacement of said actuator is converted to radial displacement of said collet via said conical portions wherein said collet grips a workpiece; and an annular nose cap mounted to said body and wherein said body includes a radial flange, further wherein said collet is axially trapped between said nose cap and said radial flange, wherein said radial flange of said body includes at least one dowel pin mounted axially thereto and further wherein said collet includes a radially extending flange having a relief therein for cooperating with said at least one dowel pin.

9. A mechanically actuated arbor comprising an actuator having a tapered surface, and a collet at least partially composed of a plastic material wherein said collet includes a metal substrate that includes a cylindrical portion and a conical portion terminating an outboard end of the substrate and said collet further includes a plastic coating adhered and molded to said metal substrate to overlie said conical portion, and wherein said collet further includes opposed surfaces of revolution including a tapered surface of said conical portion of said metal substrate for axial slidable engagement with said tapered surface of said actuator and an oppositely disposed workpiece-engaging surface of said plastic coating.

10. The mechanically actuated arbor of claim 9 further comprising:
    said collet having at least one relief slot;
    a body supporting said collet; and
    the actuator supported by said body and being linearly displaceable to impose a force on said collet such that linear displacement of said actuator is converted to radial displacement of said collet via said tapered surfaces wherein said collet grips a workpiece.

11. The mechanically actuated arbor of claim 10, further comprising an annular nose cap mounted to said body and wherein said body includes a radial flange, further wherein said collet is axially trapped between said nose cap and said radial flange.

12. The mechanically actuated arbor of claim 10 further comprising an annular nose cap mounted to said body and wherein said body includes a radial flange and an axial flange extending therefrom, further wherein said collet is radially trapped between said nose cap and said axial flange.

13. The mechanically actuated arbor of claim 9 wherein said collet includes a plurality of cantilevered leaves.

14. The arbor of claim 9, wherein the plastic coating is coated to the metal substrate such that the metal substrate is first coated with an adhesive and then the plastic coating is molded to the metal substrate and cured to adhere the plastic coating to the metal substrate.

15. A mechanically actuated arbor comprising:
    a collet at least partially composed of a plastic material wherein said collet includes a metal substrate that includes a cylindrical portion and a conical portion terminating an outboard end of the substrate and being coated with said plastic material, wherein the plastic material is adhered to the metal substrate by coating an adhesive on the metal substrate and then molding the plastic material around the metal substrate, said collet having at least one relief slot and a conical portion;
    a body supporting said collet;
    an actuator supported by said body and having a conical portion for cooperating with said conical portion of said collet, said actuator being linearly displaceable to impose a force on said collet such that linear displacement of said actuator is converted to radial displacement of said collet via said conical portions wherein said collet grips a workpiece; and an annular nose cap mounted to said body and wherein said body includes a radial flange, further wherein said collet is axially trapped between said nose cap and said radial flange;

wherein said radial flange of said body includes at least one dowel pin mounted axially thereto and further wherein said collet includes a radially extending flange having a relief therein for cooperating with said at least one dowel pin.

16. A mechanically actuated chuck comprising an actuator having a tapered surface, and a collet at least partially composed of a plastic material wherein said collet includes a metal substrate that includes a cylindrical portion and a conical portion terminating an outboard end of the substrate and said collet further includes a plastic coating adhered and molded to said metal substrate to overlie said conical portion, and wherein said collet further includes opposed surfaces of revolution including a tapered surface of said conical portion of said metal substrate for axial slidable engagement with said tapered surface of said actuator and an oppositely disposed workpiece-engaging surface of said plastic coating.

17. The mechanically actuated chuck of claim 16, further comprising:
    said collet having at least one relief slot and the tapered surface at an outboard end and a connecting portion at an inboard end;
    a body supporting said collet;
    an annular nose cap attached to said body, said annular nose cap having a tapered surface for cooperating with said tapered surface of said collet; and
    an actuator extending through said body and having a connecting portion for connecting with said connecting portion of said collet, said actuator being linearly displaceable to impose a force on said collet such that linear displacement of said actuator is converted to radial displacement of said collet via said cooperating tapered surfaces of said annular nose cap and said collet wherein said collet grips a workpiece.

18. The mechanically actuated chuck of claim 16 wherein said collet includes a plurality of cantilevered leaves.

19. The chuck of claim 16, wherein the plastic coating is coated to the metal substrate such that the metal substrate is first coated with an adhesive and then the plastic coating is molded to the metal substrate and cured to adhere the plastic coating to the metal substrate.

20. A mechanically actuated workpiece holder for holding a workpiece comprising:
    a body;
    an actuator extending through at least a portion of said body and including a frusto-conical surface; and
    a collet carried by said body for cooperation with said actuator and including:
        a metal substrate that includes a cylindrical portion and a conical portion, and
        a plastic coating adhered and molded to said metal substrate to overlie said conical portion of said metal substrate,
        said collet also including opposed surfaces of revolution including a frusto-conical surface of said conical portion of said metal substrate for axial sliding engagement with said frusto-conical surface of said actuator and an oppositely disposed workpiece-engaging surface of said plastic coating, wherein said collet is adapted to be radially displaced by linear movement of said actuator for engaging said workpiece-engaging surface of said collet with the workpiece.

21. The workpiece holder of claim 20 wherein said surfaces of revolution are interrupted such that said collet includes a plurality of cantilevered leaves.

22. The holder of claim 20, wherein the plastic coating is coated to the metal substrate such that the metal substrate is first coated with an adhesive and then the plastic coating is molded to the metal substrate and cured to adhere the plastic coating to the metal substrate.

23. A collet for a mechanically actuated workpiece holding apparatus including an actuator having a tapered surface, comprising:

a metal substrate including a cylindrical portion and a conical portion, a plastic coating adhered and molded to said metal substrate to overlie said conical portion, and opposed surfaces of revolution including a tapered surface of said conical portion of said metal substrate for axial slidable engagement with the tapered surface of the actuator and an oppositely disposed workpiece-engaging surface of said plastic coating.

24. The collet of claim 23, wherein the plastic coating is coated to the metal substrate such that the metal substrate is first coated with an adhesive and then the plastic coating is molded to the metal substrate and cured to adhere the plastic coating to the metal substrate.

\* \* \* \* \*